United States Patent Office 3,139,417
Patented June 30, 1964

3,139,417
PROCESS FOR PRODUCING POLYOXAMIDES
Frederick Keith Duxbury, Manchester, England, assignor to Imperial Chemical Industries Limited, London, England, a corporation of Great Britain
No Drawing. Filed Mar. 14, 1960, Ser. No. 14,568
Claims priority, application Great Britain Mar. 26, 1959
9 Claims. (Cl. 260—78)

This invention relates to an improved process for manufacturing polyamides.

Linear fibre-forming polyamides of the class commonly described as polyoxamides are already well known. Polyoxamides such as those obtained by reacting oxalic acid diesters with methyl substituted hexamethylene diamines, or mixtures of methyl substituted hexamethylene diamines with hexamethylene diamine as further described in U.K. specifications Nos. 737,939 and 781,289 are especially valuable.

Hitherto a difficulty in the preparation of polyoxamides has been to obtain products with a sufficiently high molecular weight as indicated by their inherent viscosity. High molecular weight is usually associated with good fibre properties. To attain the necessary level of inherent viscosity it has previously been suggested to perform the reaction in stages in the presence of a catalyst such as phosphorous acid and to remove volatile reaction products under vacuum. The use of catalysts is undesirable because of their corrosive property and tendency to impart color to the polymer; the use of a vacuum treatment adds to the cost and is not always convenient. Furthermore the production of polyoxamides with the desired inherent viscosity has not always been possible by the use of such expedients.

Two factors have now been found to limit the inherent viscosity of polyoxamides obtained by reacting oxalic acid diesters with diamines; these are (a) The thermal instability of the oxamic ester groups (I), especially the methyl oxamate group

—NH.CO.COOR
(I)

(I, R=CH$_3$): Compared with the methyl oxamate group the ethyl (I, R=C$_2$H$_5$), n-propyl (I, R=CH$_3$.(CH$_2$)$_2$.) and particularly the butyl (I, R=C$_4$H$_9$) oxamate groups are considerably more thermally stable.

(b) The amount of alcohol retained by the polyoxamide: The concentration of this retained alcohol can be substantially reduced by preparing the polyoxamides in an organic solvent which acts as an entraining agent and also preferably forms an azeotrope with the alcohol liberated during polymerization.

By taking these two factors into account, polyoxamides of inherent viscosity greater than 0.8 may be readily obtained without the use of a catalyst, or resort to working at reduced pressure or heating for prolonged periods.

U.K. patent specification No. 740,928, U.K. patent specification No. 737,939, French patent specifications Nos. 881,333 and 894,172 disclose the preparation of polyoxamides in the presence of organic solvents which function as diluents. Although the diluents referred to in these specifications may assist in the removal of the alcohol formed during initial polymerization the amounts of diluents employed in the examples are insufficient to ensure complete removal of the alcohol. It is also disclosed that alcohols (e.g., n-butanol) may be used as solvents and if desired the organic solvent may be omitted. Both of the latter modifications tend to increase the amount of alcohol retained by the polymer with corresponding impairment of physical properties.

According to the present invention we provide an improved process for the manufacture of polyoxamides from an oxalic acid di-ester wherein the esterifying alcohol contains from 2 to 5 carbon atoms and a di-primary amine, characterized in that the initial stage of the polymerization process is performed at a temperature below 220° C. in the presence of an organic liquid which may be either an entraining agent of boiling point higher than the alcohol liberated or preferably a liquid which is able to form an azeotrope with the alcohol liberated during the initial stage of the polymerization process, the entraining or azeotroping liquid being present in sufficient amount to ensure that all the alcohol liberated during the initial stage of the polymerization process is removed before completion of the polymerization such completion of polymerization being performed preferably at atmospheric pressure by heating at a temperature of from 200° to 300° C.

As suitable oxalic esters there may be used any diester of oxalic acid in which the alkyl groups contain from 2 to 5 carbon atoms for example diethyloxalate, di-n-propyloxalate, di-n-butyloxalate, di-iso-butyloxalate, di-sec.-butyloxalate and di-n-amyloxalate. Methyl esters are not to be used because of the thermal instability of the derived polyamides and their lower inherent viscosity. The oxalic diesters when mixed with water, should not turn bromocresol purple indicator yellow.

Examples of suitable diamines include those of formulae NH$_2$.(CH$_2$)$_n$.NH$_2$ in which $n$=7 to 10, β- and γ-methylhexamethylene diamine, 3-methoxyhexamethylene diamine, 2:3, 2:4, 2:5, and 3:4-dimethylhexamethylene diamines and 2:11-diaminododecane. These diamines may be used alone or in admixture with hexamethylene diamine. Mixtures of β- and γ-methylhexamethylene diamines are especially valuable either used alone or in admixture with hexamethylene diamine.

As organic liquids able to form an azeotrope with the alcohol liberated during the reaction it is preferred to employ solvents such as benzene, toluene, xylene, ethylbenzene, chlorobenzene and cyclohexane. Suitable non-azeotroping liquids are di-n-butyl ether and propylbenzene. In the case of diluents capable of forming an azeotrope with the alcohol liberated, sufficient of the organic liquid is present in the reaction mixture to form an azeotrope with all of the alcohol liberated during the initial polymerization stages comprises substantially all the total alcohol present in combined form in the oxalic ester employed as starting material.

As well as the organic liquid which acts as an entraining agent or which is capable of forming an azeotrope with the alcohol liberted during polymerization other organic solvents may be present as diluents of the reaction mixture provided that these other solvents do not interfere with the action of the entraining or azeotroping agent.

It is essential to exclude air during the manufacturing process and it is advantageous to perform the polymerization in an atmosphere of an inert gas such as nitrogen or carbon dioxide.

By employing the process of the present invention valuable fibre-forming polyoxamides may be obtained having inherent viscosities at 25° C. of at least 0.8 and melt viscosities at 280° C. of at least 700 poises. The term inherent viscosity used herein is calculated from the expression

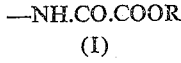

$$\frac{\text{Log}_e\left(\frac{\text{Viscosity of polymer solution}}{\text{Viscosity of solvent}}\right)}{C}$$

where C, the concentration of solution expressed as grams of solute per 100 ml. of solvent, is 0.5% (w./v.) and the solvent is m-cresol. The Modified Vicat softening points used herein are determined by the penetrometer method described by O. B. Edgar and E. Ellery in the Journal of the Chemical Society, 1952, page 2638. The melt viscosities used herein are determined by the capillary rise method described by P. J. Flory in the Journal of the American Chemical Society, 1940, page 1057.

The invention is illustrated by the following examples in which parts and percentages are by weight:

*Example 1*

10.1 parts of di-n-butyloxalate and 8.5 parts of xylene are added to 6.5 parts of a mixture of approximately 10% of β- and 90% of γ-methylhexamethylene diamines and 8.5 parts of xylene. The precipitated pre-polymer is stirred under nitrogen and heated to between 160° C. and 170° C. until 17 parts of distillate, essentially xylene/butanol azeotrope and excess xylene, have collected. The residue is then heated at 260° C. and atmospheric pressure for a further hour. The resulting polymer has a softening point of 247.5° C. (Modified Vicat) and an inherent viscosity of 0.98. The melt viscosity at 280° C. is 1,947 poises.

*Example 2*

10.1 parts of di-sec.-butyloxalate and 8.5 parts of xylene are added to 6.5 parts of a mixture of approximately 10% of β- and 90% of γ-methylhexamethylene diamines and 8.5 parts of xylene. The precipitated pre-polymer is stirred under nitrogen and heated to between 160° C. and 170° C. until 20 parts of distillate, essentially xylene/sec.-butanol azeotrope and excess xylene, have collected. The residue is then heated at 263° C. and atmospheric pressure for a further 1.5 hours. The resulting polymer has an inherent viscosity of 0.82 and melt viscosity at 280° C. of 788 poises.

*Example 3*

10.1 parts of di-n-butyloxalate and 8.5 parts of xylene are added to 8.6 parts of decamethylene diamine and 17 parts of xylene. The precipitated pre-polymer is stirred under nitrogen and heated at 170° C. until 31 parts of distillate have collected. The residue is then heated at 263° C. and atmospheric pressure for a further 1.5 hours. The resulting polymer has a softening point of 260° C. (Modified Vicat) and a melt viscosity at 280° C. of 1285 poises.

*Example 4*

10.1 parts of di-n-butyloxalate and 8.5 parts of toluene are added to 6.51 parts of γ-methylhexamethylene diamine and 8.5 parts of toluene. The precipitated pre-polymer is stirred under nitrogen and heated to between 160° C. and 170° C. until 20 parts of distillate, essentially toluene/n-butanol azeotrope and excess toluene, have collected. The residue is then heated at 263° C. and atmospheric pressure for a further 1.5 hours. The resulting polymer has an inherent viscosity of 0.88 and melt viscosity at 280° C. of 1100 poises.

*Example 5*

A polymer is prepared in similar manner to that of Example 4 replacing toluene with n-butanol by adding 10.1 parts of di-n-butyloxalate and 8.5 parts of n-butanol to 6.51 parts of γ-methylhexamethylene diamine and 8.5 parts of n-butanol. 20 parts of distillate (n-butanol) is collected. The polymer has an inherent viscosity of only 0.72 and melt viscosity at 280° C. of only 597 poises.

A further polymer, prepared in the absence of entraining agent by adding 6.336 parts of a mixture of approximately 10% of β- and 90% of γ-methylhexamethylene diamines to 9.845 parts of di-n-butyloxalate, has an inherent viscosity of only 0.44 and melt viscosity of only 50 poises at 280° C. In the manufacture of this last polymer the pre-polymer is heated at atmospheric pressure for 0.5 hour at 170° C. and then for a further 1.5 hours at 263° C.

*Example 6*

11.753 parts of di-iso-butyloxalate and 8.5 parts of xylene are added to a mixture of 1.44 parts of hexamethylene diamine, 5.95 parts of γ-methylhexamethylene diamine and 17 parts of xylene. The precipitated prepolymer is stirred under nitrogen and heated to between 160° C. and 170° C. until 30 parts of distillate, essentially xylene/iso-butanol azeotrope and excess xylene, have collected. The residue is then heated at 263° C. and atmospheric pressure for a further 1.5 hours. The resulting polymer has a softening point of 264.5° C. (Modified Vicat) and an inherent viscosity of 0.9. The melt viscosity at 280° C. is 1226 poises.

*Example 7*

7.3 parts of diethyloxalate and 26 parts of toluene are added to 6.5 parts of a mixture of approximately 10% of β- and 90% of γ-methylhexamethylene diamines and 26 parts of toluene. The precipitated pre-polymer is stirred under nitrogen and heated to between 80° C. and 120° C. until 10 parts of distillate, essentially toluene/ethanol azeotrope, has collected. The prepolymer is then filtered and heated at 263° C. and atmospheric pressure for a further 1.5 hours. The resulting polymer has a softening point of 251.5° C. (Modified Vicat) and an inherent viscosity of 0.8. The melt viscosity at 280° C. is 713 poises.

*Example 8*

Replacement of the diethyloxalate in Example 7 with 5.9 parts of dimethyloxalate yields a polymer with an inherent viscosity of only 0.39 and melt viscosity at 280° C. of only 238 poises.

*Example 9*

10.1 parts of di-iso-butyloxalate and 8.5 parts of xylene are added to 6.5 parts of γ-methylhexamethylene diamine and 8.5 parts of xylene. The precipitated pre-polymer is stirred under nitrogen and heated to between 160° C. and 170° C. until 20 parts of distillate have collected. The residue is then heated at 263° C. and atmospheric pressure for a further hour. The resulting polymer has a melt viscosity at 280° C. of 2025 poises and an inherent viscosity of 1.0.

*Example 10*

A mixture of 1.46 parts of diethyloxalate, 8.08 parts of di-n-butyloxalate and 8.5 parts of xylene is added to 6.5 parts of γ-methylhexamethylene diamine and 8.5 parts of xylene. The precipitated pre-polymer is stirred under nitrogen and heated to between 160° C. and 170° C. until 20 parts of distillate have collected. The residue is then heated at 263° C. and atmospheric pressure for a further 1.5 hours. The resulting polymer has an inherent viscosity of 0.86 and melt viscosity at 280° C. of 943 poises.

*Example 11*

10.1 parts of di-n-butyloxalate and 26 parts of toluene are added to 6.5 parts of a mixture of approximately 10% of β- and 90% of γ-methylhexamethylene diamines and 26 parts of toluene. The precipitated pre-polymer is stirred under nitrogen and heated to between 100° C. and 130° C. until 22 parts of distillate, essentially toluene/n-butanol azeotrope, have collected. The prepolymer is then filtered and heated at 263° C. and atmospheric pressure for a further 1.5 hours. The resulting polymer has an inherent viscosity of 0.97 and the melt viscosity at 280° C. is 1970 poises.

What I claim is:

1. A process for the manufacture of polyoxamides having an inherent viscosity of at least 0.8 at 25° C., the inherent viscosity being equal to $$\frac{\mathrm{Log}_e\left(\frac{\text{Viscosity of polymer solution}}{\text{Viscosity of solvent}}\right)}{C}$$

where C is the concentration of solution expressed as grams of solute per 100 ml. of solvent and is 0.5% (w./v.) and the solvent is m-cresol, from a diester of oxalic acid with an esterifying alcohol containing from 2 to 5 carbon atoms and an alkylene di-primary amine comprising heating a mixture consisting essentially of said diester and said amine in a first stage to a temperature not greater than 220° C. in the presence of an inert organic liquid selected from the group consisting of an entraining agent having a boiling point higher than said alcohol and liquids which from azeotropic mixtures with said alcohol, said organic liquid being present in an amount sufficient to ensure that all the alcohol liberated during the initial stage of the polymerization is removed before completion of the polymerization, removing said organic liquid and substantially all of the liberated alcohol by evaporation, and completing polymerization by heating the reaction mixture at a temperature between about 200° and 300° C.

2. A process as set forth in claim 1 in which said amine is 3-methoxyhexamethylene diamine.

3. A process as set forth in claim 1 in which said completion of polymerization is carried out at atmospheric pressure.

4. A process as set forth in claim 1 in which the temperature during said first stage is between about 80° and 170° C.

5. Process according to claim 1 wherein said di-primary amine is selected from the group consisting of alkylene diamines of the formula $NH_2.(CH_2)_n.NH_2$ in which $n$ is 7 to 10, $\beta$- and $\gamma$-methylhexamethylene diamine, 3-methoxyhexamethylene diamine, 2:3, 2:4, 2:5 and 3:4-dimethylhexamethylene diamines and 2:11-diaminododecane and mixtures thereof with hexamethylene diamine.

6. A process as set forth in claim 1 in which said di-primary amine is a mixture of $\beta$- and $\gamma$-methylhexamethylene diamine.

7. A process as set forth in claim 1 in which said di-primary amine is a mixture of $\beta$- and $\gamma$-methylhexamethylene diamines and hexamethylene diamine.

8. A process for the manufacture of a polyoxamide having an inherent viscosity of at least 0.8 at 25° C., the inherent viscosity being equal to $$\frac{\mathrm{Log}_e\left(\dfrac{\text{Viscosity of polymer solution}}{\text{Viscosity of solvent}}\right)}{C}$$

where C is the concentration of solution expressed as grams of solute per 100 ml. of solvent and is 0.5% (w./v.) and the solvent is m-cresol, which comprises heating a mixture consisting essentially of about 10.1 parts of di-n-butyloxylate and about 6.5 parts of $\beta$- and $\gamma$-methylhexamethylene diamines in a first stage to a temperature not greater than 220° C. in the presence of about 17 parts of xylene, removing by evaporation the xylene and n-butyl alcohol liberated in said first stage and completing polymerization by heating the reaction mixture at a temperature between about 200° C. and 300° C.

9. A process for the manufacture of a polyoxamide having an inherent viscosity of at least 0.8 at 25° C., the inherent viscosity being equal to $$\frac{\mathrm{Log}_e\left(\dfrac{\text{Viscosity of polymer solution}}{\text{Viscosity of solvent}}\right)}{C}$$

where C is the concentration of solution expressed as grams of solute per 100 ml. of solvent and is 0.5% (w./v.) and the solvent is m-cresol, which comprises heating a mixture consisting essentially of about 10.1 parts di-n-butyloxylate and about 8.6 parts of decamethylene diamine in a first stage to a temperature not greater than 220° C. in the presence of about 17 parts of xylene, removing by evaporation the xylene and n-butyl alcohol liberated in said first stage and completing the polymerization by heating the reaction mixture at a temperature between about 200° C. and 300° C.

References Cited in the file of this patent

UNITED STATES PATENTS 2,704,282 Stamatoff _____ Mar. 15, 1955

FOREIGN PATENTS 740,928 Great Britain _____ Nov. 13, 1955
737,939 Great Britain _____ Oct. 5, 1955